US012725055B2

(12) United States Patent
Chow et al.

(10) Patent No.: US 12,725,055 B2
(45) Date of Patent: Sep. 1, 2026

(54) CURATED MACHINE LEARNING WORKFLOW SUGGESTIONS AND CLUSTERING TECHNIQUES

(71) Applicant: Oracle International Corporation, Redwood Shores, CA (US)

(72) Inventors: Simon Chow, San Francisco, CA (US); Ángel Osvaldo Villagrana Rodríguez, Guadalajara (MX); Juan Antonio Rivera María, Guadalajara (MX)

(73) Assignee: Oracle International Corporation, Redwood Shores, CA (US)

( * ) Notice: Subject to any disclaimer, the term of this patent is extended or adjusted under 35 U.S.C. 154(b) by 1228 days.

(21) Appl. No.: 17/177,298

(22) Filed: Feb. 17, 2021

(65) Prior Publication Data

US 2022/0198298 A1 Jun. 23, 2022

Related U.S. Application Data

(60) Provisional application No. 63/126,623, filed on Dec. 17, 2020.

(51) Int. Cl.
*G06N 5/04* (2023.01)
*G06F 16/185* (2019.01)
*G06N 20/00* (2019.01)

(52) U.S. Cl.
CPC ............. *G06N 5/04* (2013.01); *G06F 16/185* (2019.01); *G06N 20/00* (2019.01)

(58) Field of Classification Search
CPC ......... G06N 5/04; G06N 20/00; G06F 16/185
See application file for complete search history.

(56) References Cited

U.S. PATENT DOCUMENTS

| | | | | |
|---|---|---|---|---|
| 7,007,174 | B2 * | 2/2006 | Wheeler | G06F 21/33 726/8 |
| 8,655,907 | B2 * | 2/2014 | Hsiao | G06F 3/0484 707/769 |
| 9,870,465 | B1 * | 1/2018 | Levi | H04L 67/306 |
| 11,055,351 | B1 * | 7/2021 | Shyu | G06F 16/2379 |
| 11,347,790 | B2 * | 5/2022 | Agostino | G06F 16/9566 |
| 11,374,968 | B1 * | 6/2022 | Colón | H04L 63/1466 |
| 11,514,321 | B1 * | 11/2022 | Chen | G06N 3/09 |
| 11,580,153 | B1 * | 2/2023 | Liao | G06F 16/437 |
| 11,853,960 | B1 * | 12/2023 | Polim | G06Q 10/06316 |
| 2001/0054151 | A1 * | 12/2001 | Wheeler | G06F 21/33 713/182 |
| 2017/0124269 | A1 * | 5/2017 | McNair | G16H 50/20 |
| 2017/0180298 | A1 * | 6/2017 | Arbajian | H04L 51/42 |

(Continued)

*Primary Examiner* — Jennifer N Welch
*Assistant Examiner* — Quoc Ly Phu Phung
(74) *Attorney, Agent, or Firm* — Invoke

(57) ABSTRACT

Techniques for providing recommended attribute value pairs for clustering a set of users are disclosed. The system may provide an administrator with attributes and attribute values prior to executing the clustering. The administrator may select some combinations of attribute value pairs, which the system may then use for execution of the clustering. Other techniques are disclosed for enabling an administrator to apply administrator-defined constraints to a list of recommended actions generated by a machine learning model. In some cases, the recommended actions may be specific to a particular group of users identified by execution of the administrator-informed clustering process.

16 Claims, 9 Drawing Sheets

(56) References Cited

U.S. PATENT DOCUMENTS

2021/0081758 A1* 3/2021 Zadorojniy .............. G06N 3/08
2021/0209156 A1* 7/2021 Agostino .............. G06F 16/951
2021/0266335 A1* 8/2021 Medalion ............... G06N 20/00

* cited by examiner

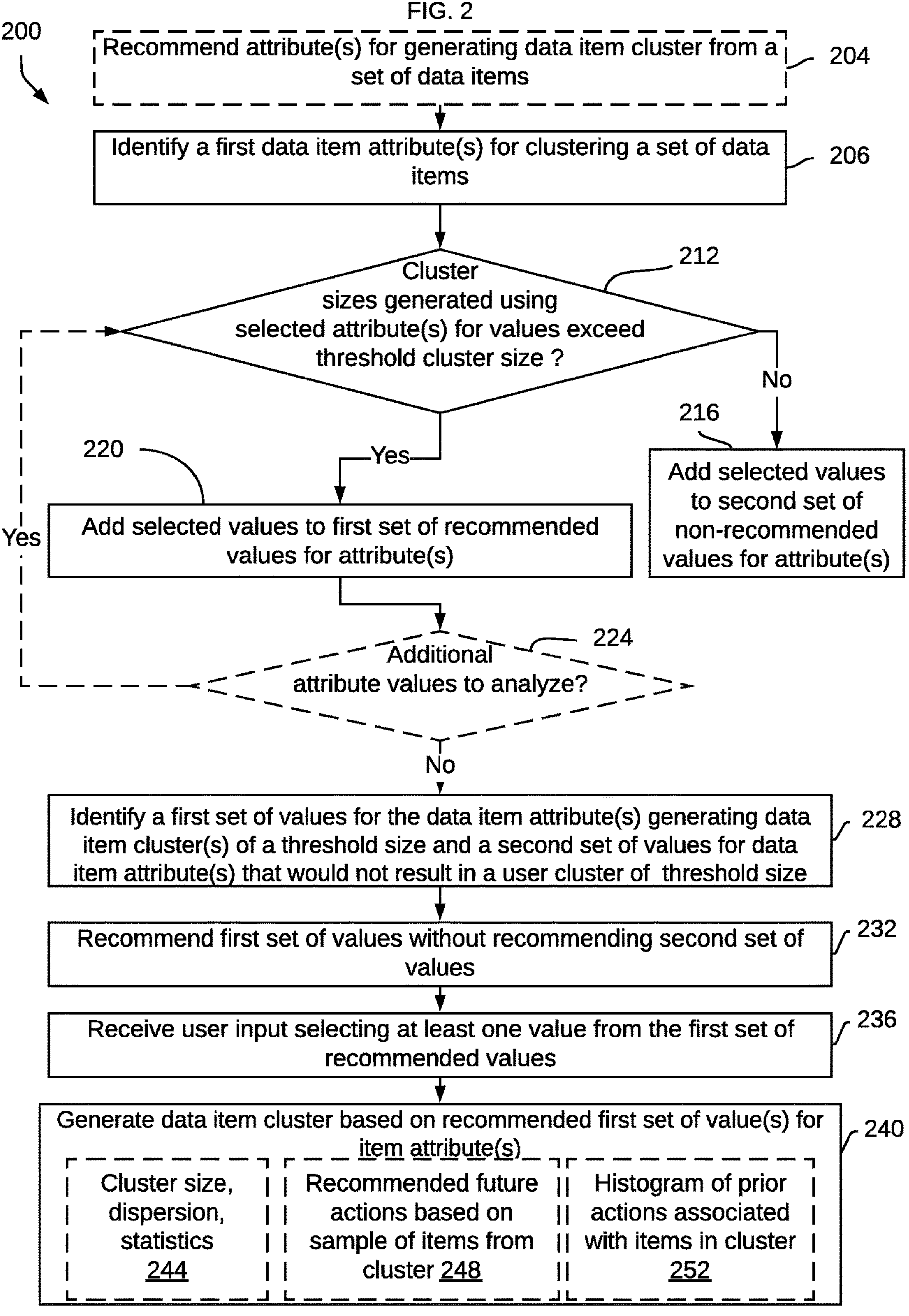
FIG. 2
200
Recommend attribute(s) for generating data item cluster from a set of data items
204
Identify a first data item attribute(s) for clustering a set of data items
206
Cluster sizes generated using selected attribute(s) for values exceed threshold cluster size ?
212
No
216
Add selected values to second set of non-recommended values for attribute(s)
220
Yes
Add selected values to first set of recommended values for attribute(s)
Yes
Additional attribute values to analyze?
224
No
Identify a first set of values for the data item attribute(s) generating data item cluster(s) of a threshold size and a second set of values for data item attribute(s) that would not result in a user cluster of threshold size
228
Recommend first set of values without recommending second set of values
232
Receive user input selecting at least one value from the first set of recommended values
236
Generate data item cluster based on recommended first set of value(s) for item attribute(s)
240
Cluster size, dispersion, statistics 244
Recommended future actions based on sample of items from cluster 248
Histogram of prior actions associated with items in cluster 252

DISPLAY
512
INPUT
DEVICE
514
CURSOR
CONTROL
516
MAIN
MEMORY
506
ROM
508
STORAGE
DEVICE
510
BUS
502
PROCESSOR
504
COMMUNICATION
INTERFACE
518
500
NETWORK
LINK
520
528
INTERNET
ISP
526
SERVER
530
LOCAL
NETWORK
522
HOST
524

CURATED MACHINE LEARNING WORKFLOW SUGGESTIONS AND CLUSTERING TECHNIQUES

INCORPORATION BY REFERENCE; DISCLAIMER

This application is hereby incorporated by reference: application No. 63/126,623 filed on Dec. 17, 2020. The Applicant hereby rescinds any disclaimer of claim scope in the parent application or the prosecution history thereof and advises the USPTO that the claims in this application may be broader than any claim in the parent application.

TECHNICAL FIELD

The present disclosure relates to machine generated workflows that abbreviate nested file structure navigation. In particular, the present disclosure relates to system generated user clusters and machine generated workflow suggestions, both of which may be altered using user-imposed constraints.

BACKGROUND

Hierarchical file structures are a convenient organizational structure in many situations. However, in enterprise settings with tens, hundreds, or thousands of users and job functions, a hierarchical file structure may be too vast to navigate effectively or efficiently. Accessing different resources within hierarchical file structures may require a user to remember a location of a resource, which may be difficult given the opaque nature of nested folders within the structure. Once remembered, accessing the resource may be time consuming given the need to progressively access intervening layers of the hierarchy.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 2 illustrates an example set of operations for executing a clustering process using system generated recommendations for attributes and attribute values in accordance with one or more embodiments;

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. SYSTEM GENERATED RECOMMENDATIONS FOR ATTRIBUTE VALUE SELECTIONS FOR CLUSTERING OPERATIONS
4. ADAPTING ML MODEL-GENERATED LIST OF USER ACTION RECOMMENDATIONS TO ADMINISTRATOR-DEFINED CONSTRAINTS
5. COMPUTER NETWORKS AND CLOUD NETWORKS
6. MISCELLANEOUS; EXTENSIONS
7. HARDWARE OVERVIEW

1. General Overview

One or more embodiments recommend a value for a data item attribute that results in generating a cluster of data items, from a set of data items, that is at least a threshold size. In an example, an administrator selects a "City" attribute in a process for generating a cluster of users. The system determines that a value of "San Francisco" or a value of "New York" for the "City" attribute generates a user cluster of 1000+ users. The system further determines that a value of "Des Moines" for the "City" attribute does not generate a user cluster of 1000+ users. The system recommends "San Francisco" and "New York" without recommending "Des Moines" in order to help the administrator generate user clusters of 1000+ users. The system may also identify and recommend usage of the "City" attribute without an administrator selecting the "City" attribute.

One or more embodiments apply administrator-defined constraints to a machine learning model that recommends actions for a cluster of users. A machine learning (ML) model may be trained to generate a list of actions for the cluster of users based on prior user actions. The generated list may be altered based on administrator input that defines requirements or conditions for the generated list. By applying the requirements, the system may generate a modified list of recommended actions for users that is then displayed. In an example, the administrator-defined constraints (a) require a third action in the list of recommended actions to be a career enhancing action and (b) prohibit filing a timecard from being included in a list of recommended actions. As a result of the administrator-defined constraints, the system modifies the list of recommended actions generated by the ML model to (a) list a career enhancing action as the third action (if not already included as the third action) and (b) remove filing a timecard from the list of recommended actions (if included in the list of recommended actions).

One or more embodiments described in this Specification and/or recited in the claims may not be included in this General Overview section.

2. System Architecture

Figure 1:
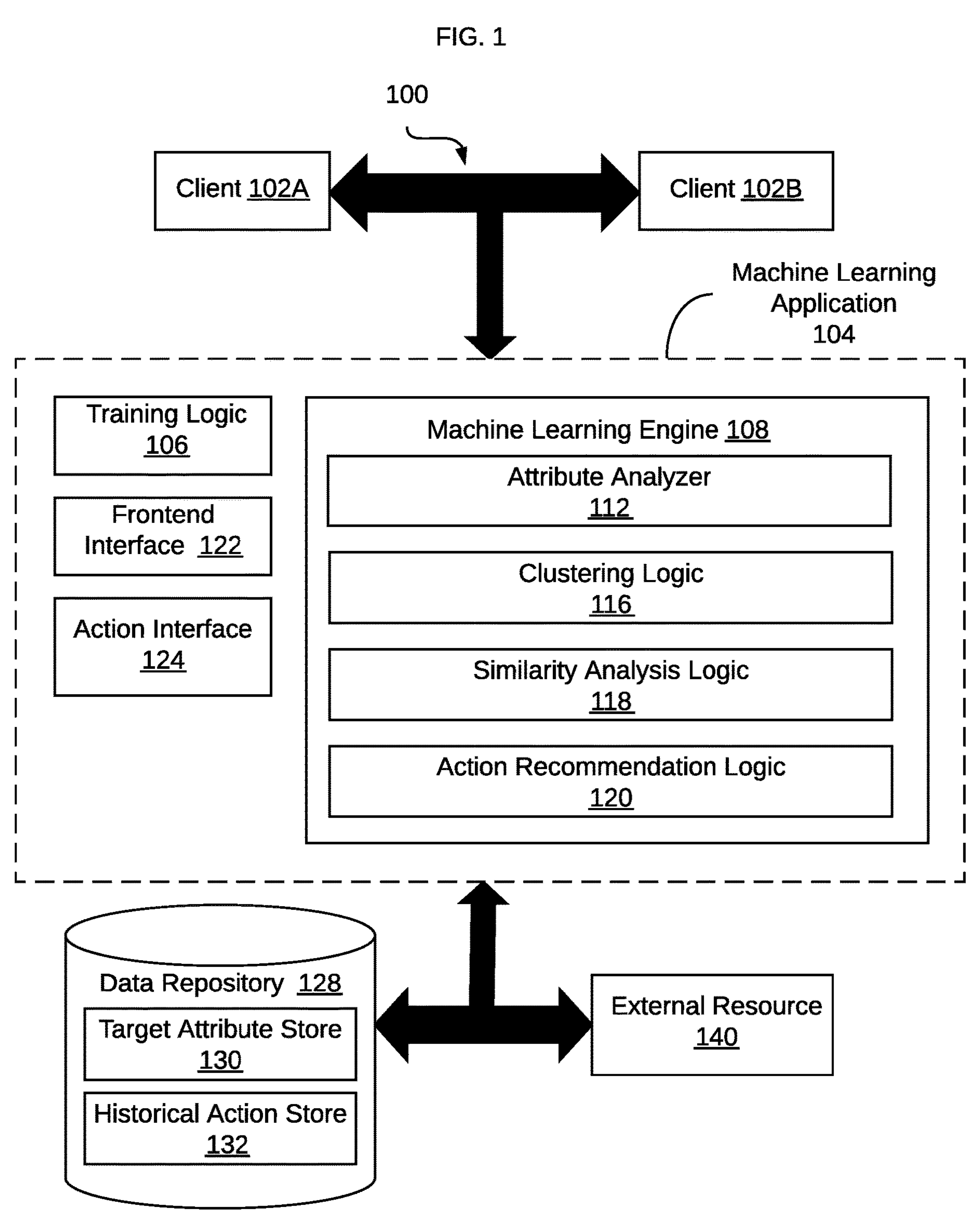
FIG. 1 illustrates a system in accordance with one or more embodiments.

FIG. 1 illustrates a system 100 in accordance with one or more embodiments. The system 100 includes elements for generating clusters of data items that are at least a threshold size. The system 100 also includes machine learning (ML) elements that may generate a list of actions to be completed by a user. The system may generate the list of actions using prior user actions (e.g., as part of a training data set). The system may also receive user modifications to the list of actions. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

The system 100 includes clients 102A, 102B, a machine learning (ML) application 104, a data repository 128, and an external resource 140.

Examples of the clients 102A, 102B may include devices for interacting with the ML application 104. For example, the clients 102A, 102B may be used to label training data and otherwise train the ML application 104 to generate data item clusters and/or generate a list of actions, as described herein. The clients 102A, 102B may also receive administrator input that is used to re-generate the user clusters and/or list of actions based on additional constraints provided by the administrator input.

In these examples, the clients 102A, 102B may be a web browser, a mobile application, or other software application communicatively coupled to a network (e.g., via a computing device). A client may interact with cloud services using one or more communication protocols, such as HTTP and/or other communication protocols of the Internet Protocol (IP) suite. In other embodiments, ML application 104 may be locally accessible to a user, such as a desktop or other standalone application.

The machine learning (ML) application 104 analyzes a "target" data set (e.g., a collection of data that has not yet been analyzed) to identify, in one embodiment, a set of recommended attributes and/or attribute values to generate data item clusters of at least a threshold size. In another embodiment, the machine learning model may analyze target data to suggest a list of actions for a particular user. In both of these embodiments, the ML application 104 is trained with a corresponding training data set in preparation for analyzing the target data.

The machine learning application 104 itself includes a training logic 106, a machine learning engine 108, a frontend interface 122, and an action interface 124.

In some examples, the training logic 106 receives a set of electronic files as input (i.e., a training corpus). Examples of electronic documents include, but are not limited to, electronically rendered data items. In one example, data items may include user profiles that include one or more attributes (e.g., location, office name, experience level, job function). Other examples of electronic documents include electronically recorded workflows (e.g., a list of tasks, a sequential list of tasks, a list of tasks prioritized based on deadline, urgency, or estimated completion time). In some examples, the electronically recorded workflows may be associated with other attributes, such as job function, job seniority level, a calendar (e.g., with task deadlines), among other attributes that may prescribe a workflow for a user.

The training data sets provided to the training logic 106 may also be processed and/or analyzed by other components of the machine learning application 104 to facilitate the analysis by the training logic. For example (and as described below), various aspects of the system 100 (e.g., the machine learning engine 108) may determine the clusters, tasks, and/or workflows by applying topic modeling, natural language processing, and/or other techniques to the data within the training data sets. These techniques may extract the information used to train the ML application 104 (e.g., workflows, job function, attributes). Similarly, these techniques may be applied to target data in preparation for analysis of the target data by the ML application 104.

The training logic 106 may be in communication with a user system, such as clients 102A, 102B. The clients 102A, 102B may include an interface used by a user to apply labels to the training data, which may facilitate the training of the ML application 104.

In some embodiments, the training logic 106 is configured to identify feature values and generate feature vectors from the training data described above, collectively referred to as a training corpus. The training logic 106 may tokenize electronically stored data into data attribute tokens. The training logic 106 may then generate feature vectors that include a sequence of values, with each value representing a different attribute token.

The training logic 106 may append other features to the generated feature vectors. In one example, a feature vector may be represented as $[f_1, f_2, f_3, f_4]$, where $f_1$, $f_2$, $f_3$ correspond to attribute tokens and where $f_4$ is a non-attribute feature. Example non-attribute features may include, but are not limited to, a label applied by a user in a supervised training system. The training logic 106 may optionally be applied to target data to incorporate user feedback of the target data into a training corpus contemporaneously with the analysis of the target data.

The machine learning (ML) engine 108 is configured to automatically learn, from the training logic 106, which attributes are associated with clusters that are at least a threshold size and workflows that are useful to provide to a user based on user attributes. Detailed explanations of these example techniques are described in the context of FIGS. 2, 3A, 3B, 3C, and 4.

At a high level, the machine learning engine 108 includes a machine learning (ML) algorithm that analyzes one or more training data sets to identify an association between attributes associated with the group (or cluster) of users and user actions. Types of ML models include but are not limited to linear regression, logistic regression, linear discriminant analysis, classification and regression trees, naïve Bayes, k-nearest neighbors, learning vector quantization, support vector machine, bagging and random forest, boosting, backpropagation, and/or clustering.

The machine learning engine 108 includes an attribute analyzer 112, clustering logic 116, similarity analysis logic 118, and action recommendation logic 120.

The attribute analyzer 112, described in more detail in the context of FIG. 2, analyzes attributes (and other data) associated with users and/or groups of users. The attribute analyzer 112, in coordination with other elements of the system 100 such as the clustering logic 116, may identify clusters of data items, based on a set of one or more attributes and/or attribute values, that are at least a threshold size. The attribute analyzer 112 may also receive user feedback regarding a selection of attributes. In this way, the system provides a user with functions that may alter a combination of attributes used to generate a cluster of data items.

The attribute analyzer 112 may analyze user data to identify one or more attributes shared by a set of data items. The attribute analyzer 112 may identify the one or more attributes by generating feature vectors that concisely represent one or more attributes associated with data items of the set. The feature vector representations may then be processed and analyzed by the various aspects of the ML application 104, as described below.

In some examples, the attribute analyzer 112 may identify these attributes by extracting the attributes and other data from data items profiles. In one example, the data item profiles may include user profiles that are used to identify clusters of users that include at least a threshold number of users. The attribute analyzer 112 may be configured to identify attributes and corresponding values in data sets and generate corresponding feature vectors. For example, the attribute analyzer 112 may identify entity attributes within training data and/or "target" data that a trained ML model is directed to analyze. Once identified, the attribute analyzer 112 may extract attribute values from one or both of training data and target data.

The attribute analyzer 112 may tokenize attributes (e.g., user attributes, attributes associated with other types of data items) into tokens. The attribute analyzer 112 may then generate feature vectors that include a sequence of values, with each value representing a different attribute token. The attribute analyzer 112 may use a document-to-vector (colloquially described as "doc-to-vec") model to tokenize attributes and generate feature vectors corresponding to one or both of training data and target data.

Similar to the training logic 106, the attribute analyzer 112 may append other features to the generated feature vectors. In one example, a feature vector may be represented as $[f_1, f_2, f_3, f_4]$, where $f_1$, $f_2$, $f_3$ correspond to attribute tokens and where $f_4$ is a non-attribute feature. Example non-attribute features may include, but are not limited to, a label quantifying a weight (or weights) to assign to one or more attributes of a set of attributes described by a feature vector. In some examples, a label may quantify an extent of a match between a set of requirements and a feature vector associated with a particular entity (whether found in target data or training data). In some examples, the label may correspond to a binary value that indicates whether or not a set of one or more attributes matches a set of one or more requirements. The attribute analyzer 112 may pass feature vectors corresponding to users of the set of users to the clustering logic 116 for further analysis.

The clustering logic 116 may identify a certain number of cluster centers (also known as "centroids"). Each cluster center represents a sub-set of data items sharing a combination of attributes. The clustering logic 116 may use any of a variety of example clustering algorithms, including but not limited to, k-means clustering.

The system may then present representations of the one or more clusters generated by the clustering logic 116 to a user via a rendered display a client 102A, 102B. In some examples, the system may present recommendations of attributes and/or attribute values that, upon receiving user selection, may generate clusters of at least the threshold size. The clustering logic 116 may also receive feedback (e.g., via a client 102A, 102B) from an administrator that selects an attribute and/or attribute value as part of the clustering process and/or adds and/or removes one or more attributes from the attributes used to generate the one or more clusters. In this way, an administrator may exert supervisory control over the attributes selected by the system to generate clusters having a threshold size.

In addition to the ML application 104 proposing attributes/values as part of the process of generating clusters of data items (e.g., user profiles), any of which may be subsequently refined via administrator input, the system 100 may also identify workflows for users via coordinated operation of the similarity analysis logic 118 and the action recommendation logic 120 of the ML engine 108. For example, the system may identify a set and/or sequence of actions to be identified as a workflow for a particular group of a plurality of groups (i.e., "clusters") identified by the clustering logic 116.

In one embodiment, the similarity analysis logic 118 may identify a proposed workflow for a particular user by searching data for one or more users sharing attributes similar to those of the particular user. Example attributes include any combination of those attributes described above. In some examples, these attributes may include those specific to the particular user receiving a proposed workflow. Examples of these user-specific attributes include, but are not limited to, job function, seniority level, job responsibilities (e.g., timesheet approval, expense report approval, budget authorizations), and rank (e.g., department manager, group manager, division manager). In some examples, attributes that may influence a set of tasks to be included in a proposed workflow include, but are not limited to, attributes specific to an organization of which the particular user is a member. Examples of these organization-specific attributes include, but are not limited to, organization function and duties (e.g., auditing, financial accounting, human resources, asset/property administration), location, reporting structure, relationship to other related organizations (e.g., within an encompassing corporate and/or divisional superstructure), among others. In some examples, attributes that may influence a set of tasks to be included in a proposed workflow include, but are not limited to, attributes specific to a time of calendar, financial, or business year. Examples of these temporal attributes include time of business cycle (e.g., first quarter, fourth quarter), whether in absolute terms or in relationship to upcoming deadlines (e.g., budgetary and/or financial reporting deadlines), a financial year, reporting deadlines, or operational deadlines (e.g., inventory reporting deadlines, employee review deadlines, and the like).

The similarity analysis logic 118 may execute a similarity analysis (e.g., cosine similarity) between a vectorized representation of one or more attributes associated with the particular user and a data store (e.g., target attribute store 130). Details relating to the operation of the similarity analysis logic 118 are described below in the context of FIG. 4.

Once users with one or more similar attributes are identified, the action recommendation logic 120 may provide one or more recommended actions to the particular user. These one or more actions may be selected based on a degree of similarity with the attributes of the particular user, either individually or collectively. In some examples, the action recommendation logic 120 may receive user input that alters one or more of the actions prescribed in the workflow and/or an order of the actions in the workflow.

The frontend interface 122 manages interactions between the clients 102A, 102B and the ML application 104. For example, the client 102A may render a workflow for a user and receive user input that changes a priority of a particular action in the workflow or changes an action itself. In another example, the client 102B may render a user cluster generated by ML Application, receive user or administrator input that changes one or more attributes of the cluster, and then transmit and instruction to ML application 104 to generate a new user cluster based on the user input.

In some embodiments, frontend interface 122 is a presentation tier in a multitier application. Frontend interface 122 may process requests received from clients and translate results from other application tiers into a format that may be understood or processed by the clients. Frontend interface 122 may be configured to render user interface elements and receive input via user interface elements. For example, frontend interface 122 may generate webpages and/or other graphical user interface (GUI) objects. Client applications, such as web browsers, may access and render interactive displays in accordance with protocols of the internet protocol (IP) suite. Additionally or alternatively, frontend interface 122 may provide other types of user interfaces comprising hardware and/or software configured to facilitate communications between a user and the application. Example interfaces include, but are not limited to, GUIs, web interfaces, command line interfaces (CLIs), haptic interfaces, and voice command interfaces. Example user interface elements include, but are not limited to, checkboxes, radio buttons, dropdown lists, list boxes, buttons, toggles, text fields, date and time selectors, command lines, sliders, pages, and forms.

In one or more embodiments, frontend interface 122 refers to hardware and/or software configured to facilitate communications between a user and the client 102B and/or the machine learning application 104. The frontend interface 122 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of the frontend interface 122 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, the frontend interface 122 is specified in one or more other languages, such as Java, C, or C++.

Action interface 124 may include an API, CLI, or other interfaces for invoking functions to execute actions. One or more of these functions may be provided through cloud services or other applications, which may be external to the machine learning application 104. For example, one or more components of machine learning application 104 may invoke an API to access information stored in data repository 128 for use as a training document for the machine learning engine 108. As another example, an API in the action interface 124 may facilitate communications between the ML application 104, agents 102A, 102B, data repository 128, and/or external resource 140. It will be appreciated considering these examples that the actions that are performed may vary from implementation to implementation.

Action interface 124 may process and translate inbound requests to allow for further processing by other components of the machine learning application 104. The action interface 124 may store, negotiate, and/or otherwise manage authentication information for accessing external resources. Example authentication information may include, but is not limited to, digital certificates, cryptographic keys, usernames, and passwords. Action interface 124 may include authentication information in the requests to invoke functions provided through external resources.

In one or more embodiments, a data repository 128 is any type of storage unit and/or device (e.g., a file system, database, collection of tables, or any other storage mechanism) for storing data. Further, a data repository 128 may include multiple different storage units and/or devices. The multiple different storage units and/or devices may or may not be of the same type or located at the same physical site. Further, a data repository 128 may be implemented or may execute on the same computing system as the system executing the methods 200 and/or 400. Alternatively or additionally, a data repository may be implemented or executed on a computing system separate from the computing system executing the methods 200 and/or 400. A data repository 128 may be communicatively coupled to the computing system executing the methods 200 and/or 400 via a direct connection or via a network.

In the example shown, the data repository 128 includes two data stores. Specifically, the data repository 128 includes a target attribute store 130 and a historical action store 132. The target attribute store 130 may include data describing attributes associated with one or more users. In some examples, these data may be used as a reference when identifying historical user attributes similar to those of a particular user. The historical action store 132 may store historical workflows, actions, and the like for one or more users. In some examples, user profiles in the target attributes store 130 may be cross referenced to actions and/or workflow in the historical action store 132. This cross referencing enables the system to execute a coordinated analysis between user attributes and actions/workflows executed by the users associated with a particular set of attributes.

In some embodiments, the machine learning application 104 may access external resource 140, which may be a cloud service. Example cloud services may include, but are not limited to, social media platforms, email services, short messaging services, enterprise management systems, verbal communication systems (e.g., internet based voice communications, text chat communications, PTSN communications systems) and other cloud applications. Action interface 124 may serve as an API endpoint for invoking a cloud service. For example, action interface 124 may generate outbound requests that conform to protocols ingestible by external resources. Additional embodiments and/or examples relating to computer networks are described below in Section 5, titled “Computer Networks and Cloud Networks.”

In an embodiment, the system 100 is implemented on one or more digital devices. The term “digital device” generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (“PDA”), a wireless receiver and/or transmitter, a base station, a communication management device, a router, a switch, a controller, an access point, and/or a client device.

Any of the embodiments described above may be embodied as a system implemented in software and/or hardware. Each component may be distributed over multiple applications and/or machines. Multiple components may be combined into one application and/or machine. Operations described with respect to one component may instead be performed by another component.

3. System Generated Recommendations for Attribute Value Selections for Clustering Operations FIG. 2 illustrates a method 200 for recommending attribute values for a process of clustering a set of data items, in which a user may review, reject, and/or revise the criteria by which a cluster is generated. FIGS. 3A, 3B, 3C, 3D, and 3E illustrate various example user interface elements that may be used when executing the method 200, in some examples. One or more operations illustrated in FIG. 2 may be modified, rearranged, or omitted all together. Accordingly, the particular sequence of operations illustrated in FIG. 2 should not be construed as limiting the scope of one or more embodiments.

In some situations, identifying groups of data items that share traits (also referred to herein as "attributes") may be convenient in a variety of contexts. In one example, it may be helpful in various aspects of managing a large or geographically diverse userbase. Examples of userbases in which techniques described below may be useful include employees in an enterprise setting, a distributed workforce, or a multi-office workforce. For example, some groups of users sharing traits, whether job function, office location, job description, seniority level, responsibility level ("rank"), or combinations thereof may benefit from a system providing various recommended user actions associated with corresponding sets of user traits. Alternatively, user clusters may be used for communicating distribution lists, policy updates, organizing coordinated action or discussions, among other purposes. Other types of data items may also benefit from the application of the method 200, and the clustering of users is only one example application that is presented for convenience of illustration.

In some cases, a vast number of attributes and combinations of attributes is too large for an administrator to select meaningful or useful combinations of attributes. In other cases, clusters generated solely from clustering algorithms may identify clusters that may not be precise or accurate enough for the purposes intended by an administrator with knowledge of conditions not appreciated by clustering algorithms. For example, some attributes and/or values may appear prominently in a clustering algorithm but may not practically warrant this emphasis. However, clustering algorithms may not include mechanisms that permit an administrator to influence the operation of the algorithm. In light of this, the method 200 illustrates a technique by which a system may provide attribute and/or attribute value recommendations, some of which may be selected by a user (e.g., an administrator) for their usefulness and/or utility.

The system may begin the method 200 by optionally recommending one or more data item attributes to use when executing a selected clustering algorithm on a set of data items (operation 204). In one example, this recommendation improves the efficiency by which relevant clusters may be generated using subsequent operations of the process. For example, because a possible number of data items attributes and the various combinations of attributes may be vast (e.g., $2^N$, where N is the number of attributes), a user may find it difficult to select meaningful and useful combinations of attributes for even a small number of attributes. In light of this challenge, the system may identify candidate attributes according to the techniques described below and receive user selections of attributes to be used for clustering.

The recommendations of attributes/attribute values for, ultimately, generating clusters may each correspond to a different combination of attributes and therefore a different subset of data items sharing the associated attributes. In one example, attributes that may be helpful for clustering a set of users into different subsets include: work status (full time, part time, contract); job title; job rank (junior, senior, executive); location (country, state, city); office; job function (accounting, engineering, human resources, facilities management); hire date (new hire, recent hire, seasoned); number of direct and/or indirect reporting employees; and combinations thereof. These attributes are provided for illustration purposes only and other attributes may be applied in some embodiments. The system may identify attributes in the operation 204 based on estimated cluster size using the attributes, frequencies of certain attributes occurring together (e.g., employees having a same job function assigned to a same geographic location) or similar criteria.

The system may identify an attribute, from among a plurality of attributes associated with data items, to use when clustering a set of data items (operation 206). The identification of the attribute may be optionally presented as a recommendation by the system and may also be based on knowledge of an administrator.

The system may then analyze the identified attribute(s) against the set of data items to be clustered to determine whether (or which) values for the selected attributes will generate clusters that exceed a threshold cluster size (operation 212). In some examples, a threshold cluster size includes a minimum number of users associated with a cluster generated based on the selected attributes. Establishing a minimum cluster size threshold may, in some embodiments, improve the utility of an embodiment by selecting attributes that affect a sufficiently high number of users to be helpful for an administrator. This threshold cluster size may be selected based on statistical criteria (e.g., a minimum size that is statistically representative of a population or subpopulation of data items), as a proportion of a number of data items (e.g., in the case of user profile clusters, at least 5% of all users, at least 10% of users in a geographic region), or other criteria selected by an administrator. The values for the selected attributes that do not generate clusters that meet this threshold cluster size are associated with a set of values that are not recommended (operation 216). The system may add values for the selected attribute(s) that do meet the cluster threshold size to a set of recommended values for the attribute (operation 220).

The system may operationally determine whether any additional values are to be analyzed (operation 224). If additional values are to be analyzed, the system returns to the operation 212 to determine whether the additional attributes meet the threshold cluster size. If no additional values are to be analyzed, the system proceeds to the operation 228.

Based on the preceding operations, the system identifies a first set (of one or more) values for the data item attributes that generate (one or more) clusters of a threshold cluster size and a second set of (of one or more) values for the data item attributes that do not generate (one or more) clusters of the threshold cluster size (operation 228). The system may then recommend the first set of values to an administrator and not recommend the second set of values (operation 232).

As described above in the context of the operation 216, the second set of values and/or attributes that do to result in data item clusters of at least the threshold size are not recommended by the system.

An administrator, in response to receiving the recommendation may select at least one value from the recommended set of values and the system may receive this administrator selection (operation 236).

The system may generate clusters based on the received selection of one or more values from recommended first set value selections (operation 236).

In some examples, the system may display the cluster sizes (e.g., a number of users in each subset corresponding to the cluster), measures of dispersions between data points in the cluster, and other statistical measures of the accuracy and precision of the cluster (operation 244).

In one example, the system may optionally sample user profiles from a cluster of user profiles to generate one or more recommended actions for users in one or more clusters (operation 248). In some examples, displaying a histogram of past user actions may be executed concurrently with the system receiving an administrator selection of values for corresponding attributes. This real-time display concurrent with attribute value selection may aid the administrator in selecting attributes and/or attribute values and thereby aid the selection of the subset of users associated with a particular cluster. Embodiments described below may then provide these recommended actions to users as a way of expediting navigation through a hierarchical file structure and providing guidance to users on task priorities.

In some examples, the system may optionally display a histogram identifying a distribution of prior actions associated with the users in each cluster subset (operation 252). By way of illustration, a cluster may identify users that are mid-level financial accounting professionals operating in two different corporate divisions. In this illustration, the system may display a histogram identifying the most frequent actions as quarterly balance sheet preparation, quarterly inventory calculation preparation, and debt service tasks.

In some examples of the techniques described above, data corresponding to a set of data items (e.g., user identifiers and their corresponding user attributes) may be stored in a table, a set of tables, a database, or other data structure that is convenient for the storage and subsequent analysis of data item attributes. Examples of clustering parameters include a number of clusters that the set of data items is to be distributed between, a clustering method or algorithm to apply, and the like. Examples of clustering algorithms that may be applied to the data structures storing user attributes include, in some examples, k-means clustering, k-modes, fuzzy clustering, among others.

The example clustering algorithms may be adapted for application to embodiments described herein. In some examples, a k-means clustering algorithm may convert non-numerical attributes into numerical attributes, that may then be clustered. For example, a job title or job description are not typically expressed as numerical values. To enable these attributes to be clustered using a numerical clustering algorithm, such as k-means, the system may convert the non-numerical attribute into a numerical attribute using a count vectorizer process or a hash vectorizer process. Once converted into a numerical value, the system may apply a numerical clustering algorithm to these converted numerical attributes.

Upon applying a k-means clustering algorithm (or other parametric-based clustering algorithm), the system may identify a "k" number of clusters by iteratively selecting a different value of k. The system may evaluate cluster quality for the different values of k using distortion loss ("elbow") analysis and/or determining a Silhouette coefficient. For values of k that are not acceptable based on one or both of the distortion loss and/or Silhouette coefficient may be omitted from further analysis, and a new value of k may be selected.

In another example, categorical attribute values may be clustered using a trained "Word-to-Vec" feature vector generation algorithm, which are then clustered. Similarly, categorical attribute values may be clustered using a k-modes algorithm where a Hamming distance may be used on the categorical data. In still another example, a fuzzy clustering algorithm may be applied to enable individual datapoints to belong to multiple clusters identified by the fuzzy clustering algorithm.

Additional embodiments and/or examples relating to computer networks are described below in Section 5, titled "Computer Networks and Cloud Networks."

Figure 3A:
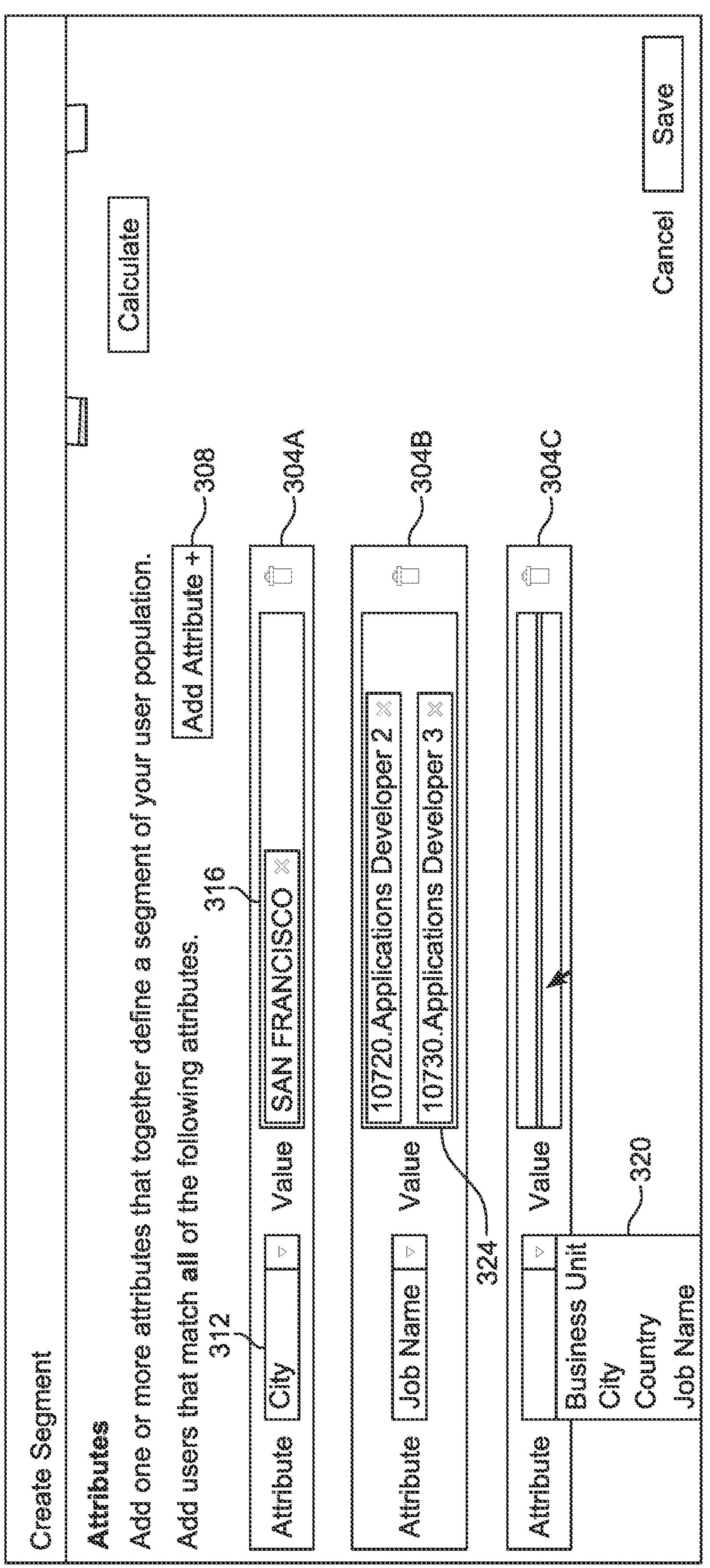
FIGS. 3A, 3B, 3C, 3D, and 3E illustrate example user interface elements corresponding to various aspects of the method depicted in FIG. 2 in accordance with one or more embodiments.

FIGS. 3A, 3B, 3C, 3D, and 3E illustrate various example user interfaces that may be configured to execute aspects of the method 200. Turning first to FIG. 3A, a user interface 300 includes features by which to select attributes and corresponding attribute values for a data items. As described above, the user interface 300 may be used to ultimately select a cluster of a threshold size.

In the illustrated example, the user interface 300 includes attribute/value selection fields 304A, 304B, and 304C (collectively 304). Additional attribute/value selection fields may be added an attribute/value selection field adder 308.

The attribute/value selection field 304A includes an attribute selection field 312 and a value selection field 316. The attribute/value selection field 304B and 304C also include these fields, but the fields are not labeled with a reference numeral for clarity of depiction. A particular attribute may be selected for the attribute selection field 312 by using any number of selection interface elements. For example, drop down menu 320 may be used to select an attribute for a particular attribute/value selection field 304. Other types of selection techniques may also be used. A similar selection interface element may be used to select a value corresponding to the selected attribute. In the specific example of attribute/value selection field 304A, the selected attribute is "city" and the selected value is "San Francisco."

In some cases, more than one value may be selected for a particular attribute. As shown in attribute/value selection field 304B, two values have been selected for the value field 324. In some examples, these values are applied to a population of users using an "OR" operation to join the attribute values. In some examples, sub-groups of user profiles (or more generically, data items) separately identified using attribute/value selection fields 304A, 304B, and 304C may be joined using an "AND" operation.

Figure 3B:
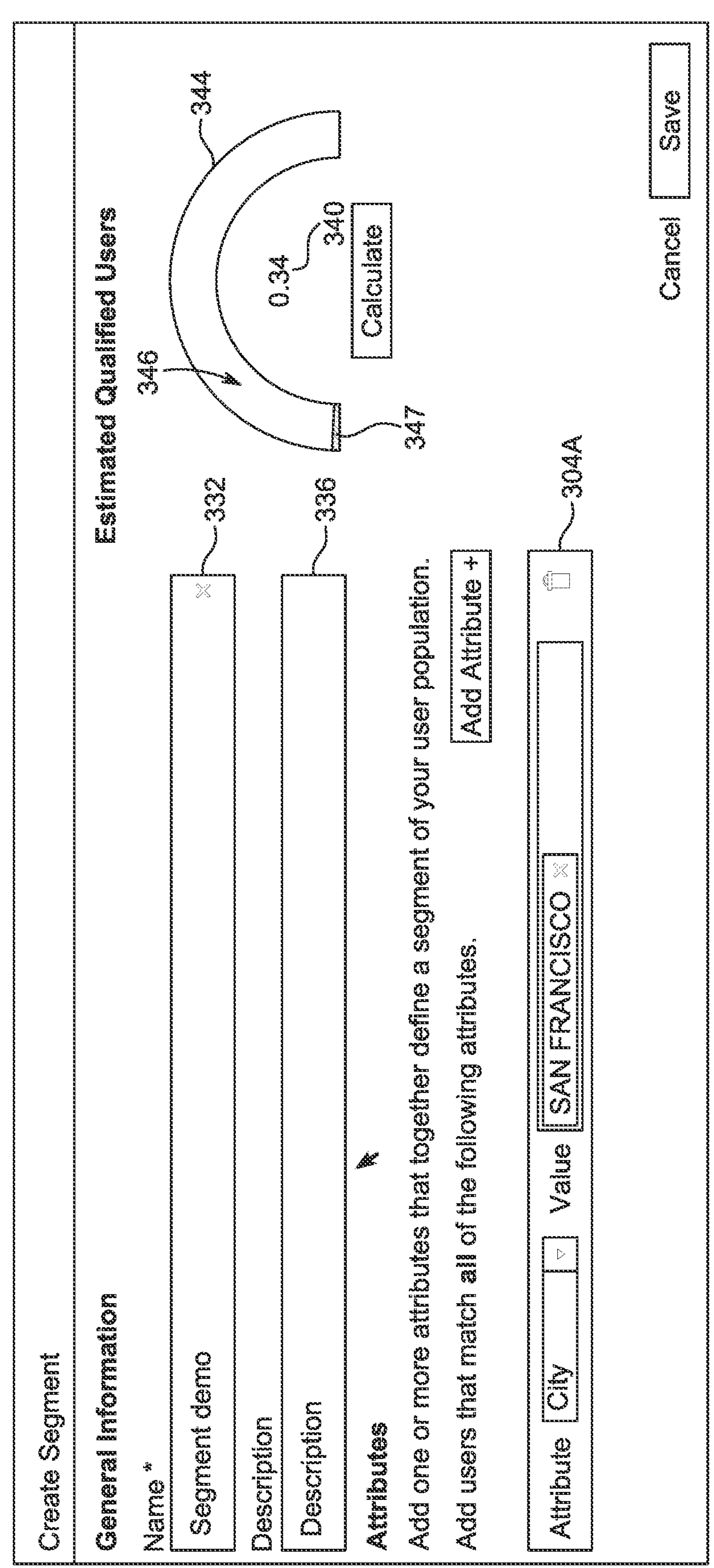

FIG. 3B presents a user interface 328 in which one or more attribute/value selection fields 304 (in this case, field 304A from FIG. 3A) may be stored as a "segment" profile. The profile may be identified using one or both of a name 332 and a description 336.

One benefit of the user interface 328 is that as the attributes and values are selected using one or more fields 304, a group size of data items (in this case, user profiles) associated with the selected attributes and attribute values (joined according to the Boolean operations identified in FIG. 3A), is dynamically presented. In this case, a proportion of total data items for the attribute/value selection in field 304A is displayed as a numerical value 340. This value may alternatively or additionally be a total number of data items that match the selected attribute values. The proportion of data items is also depicted graphically in graph 344, where the non-shaded region 346 corresponds to a total number of data items and the shaded region 347 corresponds to a portion of data items with attribute values that match those selected in the field 304A. In other words, the shaded region 347 is a graphical depiction of the numerical proportion 340.

Figure 3C:
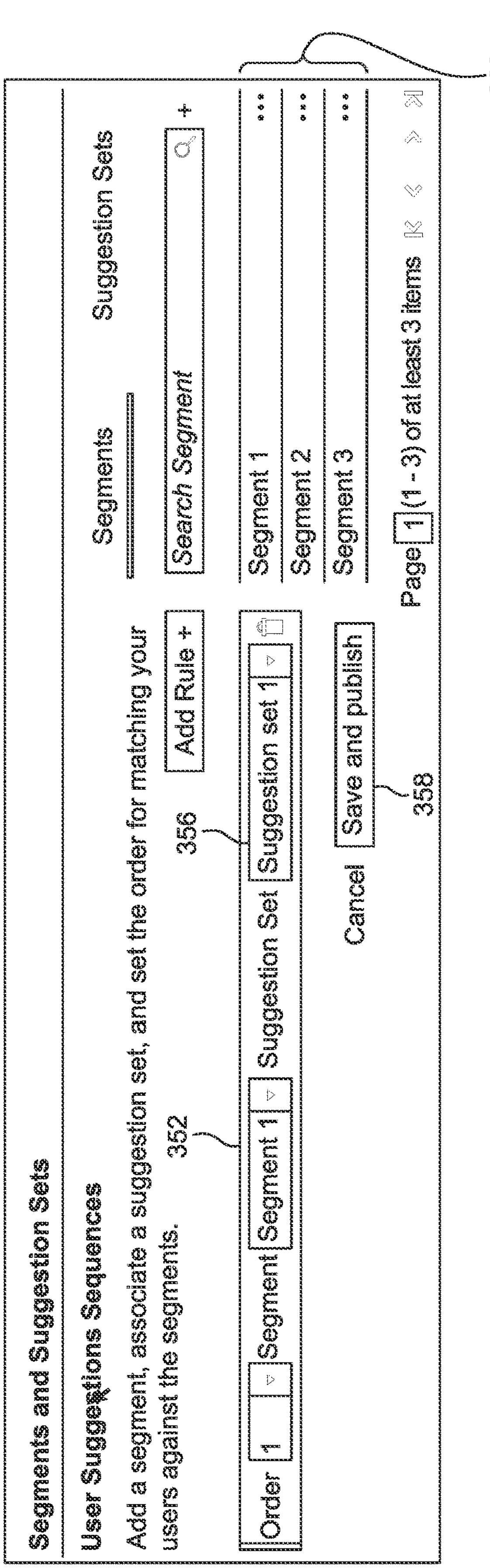

FIG. 3C illustrates a user interface 348 in which "segments" of users, such as those selected using user interface 328, may be assigned one or more actions in, for example, a workflow. As illustrated, a segment may be selected using segment selection element 352, which may then be associated with a set of actions using suggestion set selector 356. Once defined, a set of actions selected using the selector 356 may be published, transmitted, or otherwise distributed to users of the selected segment using publication selector 358.

In some examples, a list of one or more segments are presented in interface element 360. The actions associated with the segments identified in the interface element 360 may be displayed by selecting a particular one of the segments.

Figure 3D:
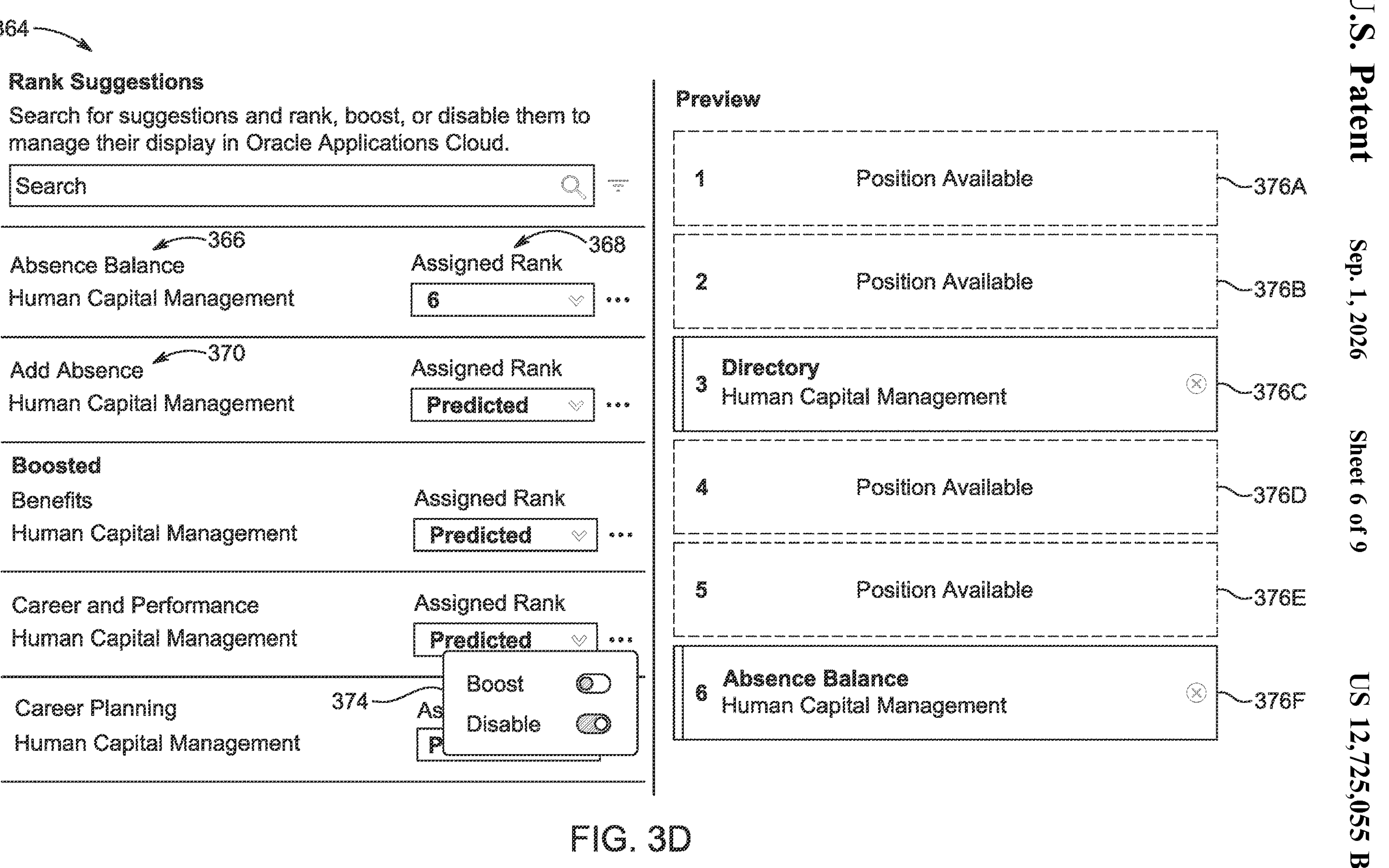

Turning to FIG. 3D, the system may present a list of candidate actions that a user may select to generate an action list and/or workflow for an associated segment (e.g., selected using interface element 360). The example interface 364 includes a list of selectable candidate actions 366 (which may also display titles and/or descriptive information 370), rank selectors 368, and rank adjustment operators 374.

A rank selector 368 associated with one or more of the candidate actions 366 may be used to assign a particular action to one of the workflow positions 376A-376F for a particular selected user segment. In the example shown, workflow positions 376C and 376F have been populated with actions based on ranks assigned by selecting a rank in the corresponding rank selector 368. Additional workflow positions may be populated with other actions by expressly selecting a position or by allowing the trained machine learning system itself to assign a "predicted" workflow position.

Figure 3E:
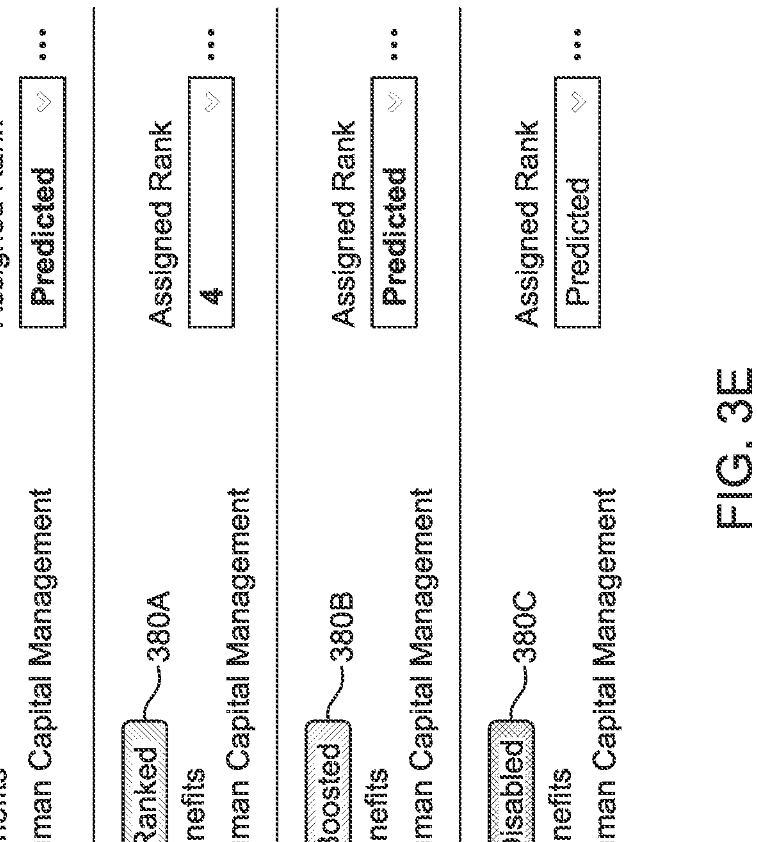

In some examples, the rank adjustment operators 374 may be applied to one or more actions. These may increase a rank, decrease a rank, "pin" (or fix a workflow position) or even disable actions within a workflow. Turning to FIG. 3E, rank adjustment operator 380A indicates that a position in a workflow corresponds to the assigned rank. Rank adjustment operator 380B indicates that a rank of the corresponding action has been increased (or "boosted") relative to the predicted rank. Rank adjustment operator 380C indicates that the action has been disabled or deactivated from the workflow. In this way, a user may alter a sequence and/or priority of actions relative to other actions in the workflow without expressly prescribing a workflow location.

Figure 4:
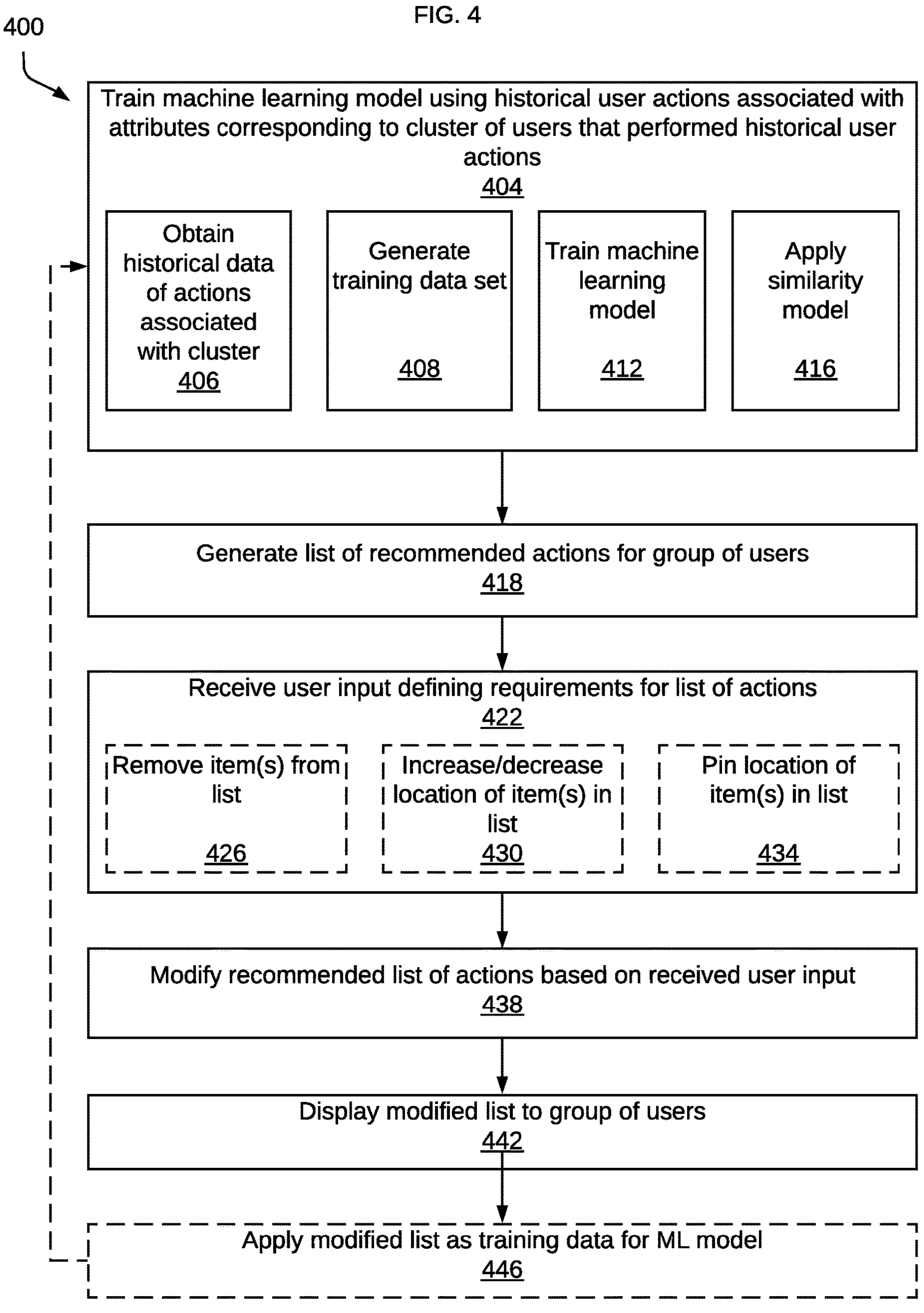
FIG. 4 illustrates an example set of operations for applying user defined constraints to recommended user actions generated by a trained machine learning model in accordance with one or more embodiments.
Figure 5:
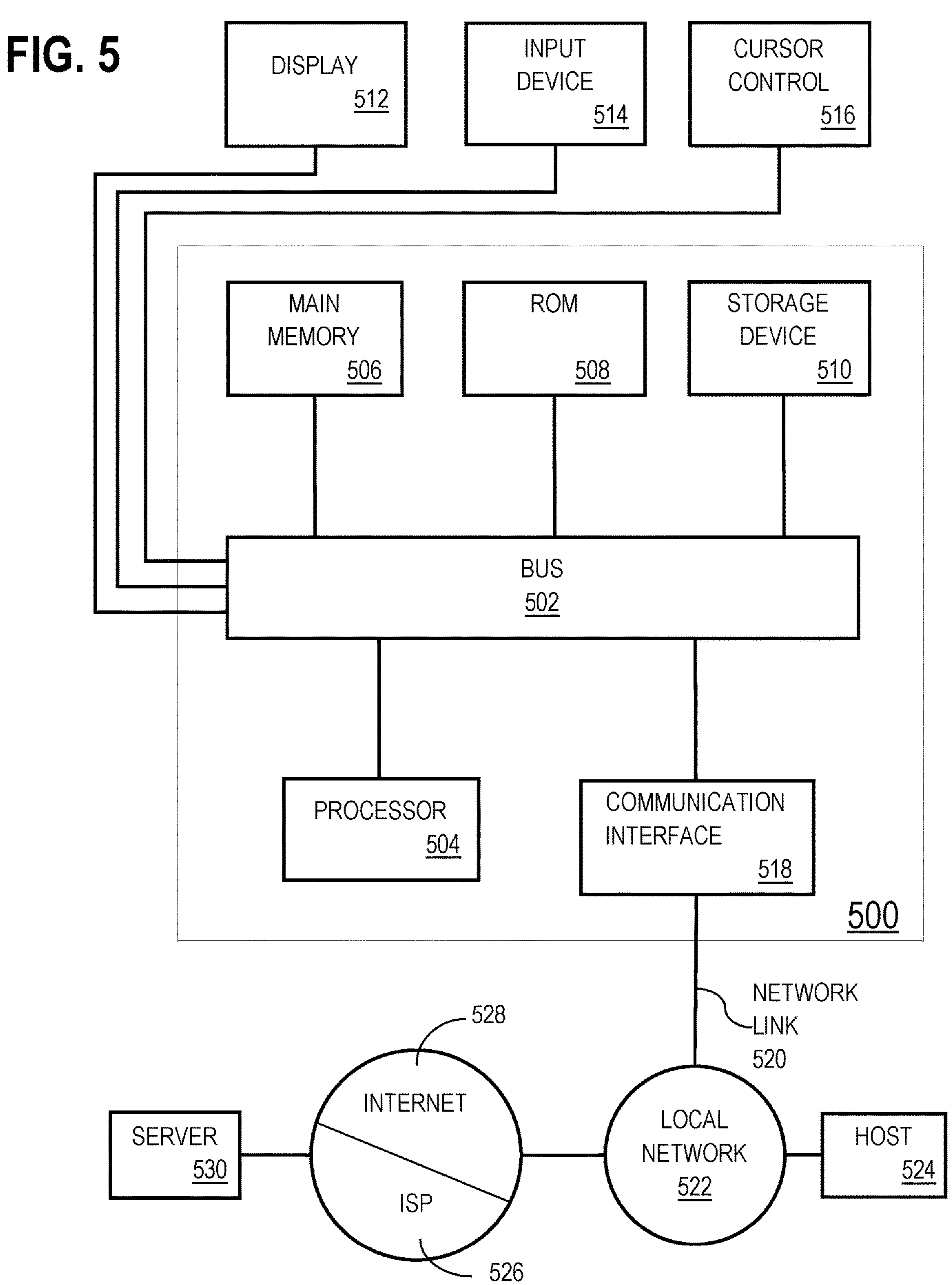
FIG. 5 shows a block diagram that illustrates a computer system in accordance with one or more embodiments.

4. Adapting ML Model-Generated List of User Action Recommendations to Administrator-Defined Constraints FIG. 4 illustrates an example set of operations in a method 400 for applying user constraints to alter results generated by a machine learning model. One or more operations illustrated in FIG. 4 may be modified, rearranged, or omitted all together. Accordingly, the particular sequence of operations illustrated in FIG. 4 should not be construed as limiting the scope of one or more embodiments.

As indicated above, machine learning techniques may be used to identify workflows for users based on various user attributes and other attributes. For example, certain job functions may be provided with reminders to perform actions at certain times of the day, week, month, or year. In one specific illustration, a manager may be notified on a Friday to review employee time sheets and submit departmental expense reports. These reminders may collectively constitute a workflow and include references that, when selected by a user, take a user directly to the resources needed to complete the tasks (e.g., a timesheet management application, an expense reporting application). Not only does such a workflow encourage timely completion of tasks, it also improves worker efficiency by avoiding time consuming and laborious navigation through a hierarchical file system and/or computing application selection systems.

However, relying solely on a machine learning algorithm to provide items in a workflow, an order of the items, and navigation links may be too restrictive. Because machine learning models are trained using historical data, inefficiencies or other undesirable behavior may be trained into the system. For example, changes to workflows driven by recent policy changes, changes to computing systems, or even inefficient user actions included in a training corpus of the machine learning model may cause the system to recommend improvident user actions.

To overcome this deficiency, techniques described below and illustrated in FIG. 4 allow for an administrator to alter the machine learning model generated workflow items. This combines the efficiency of an ML model for generating an initial workflow with the contemporaneous knowledge or insightfulness not always available to an ML model.

The method 400 may begin by training an ML model to generate a recommended list of actions for a group of users (operation 404). In some examples, the system may identify the group of users using the clustering techniques described above. As also described above, the system may identify one or more attributes associated with the users of the group. Example attributes include, but are not limited to, job function, job title, years of service, work location, among others.

Upon identifying a group of users and the associated attributes, the system may identify historical actions associated with the users of the group (operation 406). These actions may include an analysis of stored clickstream data (e.g., a series of actions taken over time and executed in one or more computing applications) or other types of stored transactional data. The system may then use the attributes and the historical action data to generate a training data set, also known as a training corpus (operation 408). The training data set (also equivalently referred to as a training corpus) may then be used to train the machine learning model (412).

In some examples, training the machine learning model includes generating a similarity model (operation 416). The similarity model may identify user actions that may be similar to one another despite differences in context, such as job function, work location, or other attribute difference. In this way, the system may train the machine learning model in a way that identifies transferable aspects of the analysis despite the natural variability in user actions, user attributes, and business operations. In some examples, the similarity model may execute its similarity analysis to identify similarities between users and/or similarities between actions.

The system may generate a similarity score using similarity measures (e.g., cosine similarity) of vectorized representations of the data (operation 416). Using the similarity score, the system may identify user attributes and/or user actions that meet a similarity threshold. Those attributes and/or user actions that meet the similarity threshold may be further analyzed by the trained machine learning model to refine the associations generated in the operation 412, thereby updating the machine learning model based on the similarity analysis.

A similarity determination model may be preprogrammed. In some embodiments, a similarity determination model may apply a set of rules and/or a lookup table. In other examples, a similarity determination model may be generated and/or updated via machine learning using the training techniques and algorithms described above.

Once updated, the ML model may be further trained by optionally applying it to additional training materials.

The system may then apply the trained machine learning model to data associated with the group of users, thereby generating a list of recommended actions for the group of users (operation 418). As indicated above, the system may generate the list based on the patterns between user attributes and user actions identified in the training operation 404.

However, as indicated above, the patterns identified by the trained ML model may not reflect current conditions or may otherwise benefit from the insights provided by an administrator. In light of this beneficial input, the system receives user input defining one or more conditions (or requirements) to apply to a list of user actions generated by the ML model (operation 422).

In one example, an administrator may apply a requirement that removes one or more of the recommended actions generated by the ML model from a recommended list of user actions (operation 426). For example, an administrator may be aware of a change to a system, business process, or job scope that causes one of the recommended actions identified by the ML model to be inapt. In light of one or more of these changed circumstances, the administrator may remove the inapt recommended action, thereby improving the usefulness of the list of the remaining ML model-generated recommended actions.

In another example, an administrator may apply a requirement that changes a priority of one or more of the recommended actions generated by the ML model (operation 430). For example, an administrator may be aware of upcoming deadlines or a level of complexity of completing an action that will likely require additional user time. In another example, an administrator may be aware that users often procrastinate a particular task. Regardless of the reason, an administrator may emphasize importance or priority of a particular task by increasing (or "boosting") its rank or location in a list of recommended actions. Similarly, an administrator may decrease a priority of a task by moving its location lower in a list of recommended actions. The system may enable the administrator to increase or decrease a rank by one, two, or more levels.

In still another example, an administrator may apply a requirement that fixes or "pins" a location of an item in a list (e.g., always at location 1, location 5, or a last (lowest) location) (operation 434). For example, upon reviewing a list of recommended actions generated by an ML model, an administrator may understand that a sequence of actions recommended by the ML model is less efficient than a different sequency of the same actions. The administrator may correct this inefficiency by pinning a location of an item at a particular location in a list. In some embodiments, an administration may pin one or more items to corresponding locations in a list of recommended action. In some embodiments, an administrator may even define groups of actions that are pinned in relationship to one another, instead of or in addition to, pinning at a prescribed position on a list of recommended actions. In some examples, this "pinning" may be equivalently referred to as assigning a persistent priority that is applied to the "pinned" action in subsequently generated lists of actions.

Based on this received input, the system may modify the ML generated list of recommended actions (operation 438). The system may then display a modified list of tasks to a group of users for which the list of tasks ("workflow") was prepared. As is clear from the preceding description, the present list of tasks in a hybrid version that incorporates some data generated by the operations of the trained ML model and some data received by administrator input.

In some examples, this modified, "hybrid" list may itself optionally be used to further train the ML model (operation 446). This training may further improve the accuracy of the trained ML model of operation 404.

5. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer-readable media storing instructions, which when executed by one or more hardware processors, cause performance of operations comprising:

identifying a first data attribute, of a plurality of data attributes, for use in clustering a set of data items;

wherein the set of data items comprises a set of user profiles;

wherein the plurality of data attributes comprises user attributes associated with the set of user profiles;

determining, by a system, a first set of one or more values for the first data attribute that result in one or more data item clusters of at least a threshold cluster size;

wherein the threshold cluster size is a minimum number of users, associated with a cluster generated based on a particular value of the first data attribute, for the system to recommend the particular value for the first data attribute;

presenting, by the system, a first graphical user interface (GUI) comprising a value selection element associated with the first data attribute, at least by:

populating, by the system, the value selection element with the first set of one or more values for the first data attribute that results in one or more data item clusters of at least the threshold cluster size; and refraining, by the system, from populating the value selection element with a second set of one or more values for the first data attribute that do not result in data item clusters of at least the threshold cluster size;

receiving, by the system via the first GUI, first user input selecting a first system-recommended value, of the first set of one or more values, for the first data attribute;

responsive to receiving the first user input selecting the first system-recommended value for the first data attribute:

identifying, by the system, a particular cluster of data items, of at least the threshold cluster size, comprising data items associated with the first system-recommended value for the first data attribute, wherein the particular cluster of data items corresponds to a cluster of users;

generating, by the system, a recommended list of actions for the cluster of users based on historical user actions; and dynamically presenting, by the system concurrently with presenting the value selection element in the first GUI, a second GUI comprising the recommended list of actions for the cluster of users.

2. The one or more non-transitory computer-readable media of claim 1, the operations further comprising:

clustering the set of user profiles into clusters based on a similarity score above a similarity threshold, wherein the similarity score is generated by comparing actions associated with user profiles associated with a particular cluster and corresponding prior actions of users associated with the particular cluster.

3. The one or more non-transitory computer-readable media of claim 1, the operations further comprising displaying a histogram of a set of frequent actions associated with user profiles of a cluster.

4. The one or more non-transitory computer-readable media of claim 3, wherein the displaying operation is executed concurrently with receiving a selection of the first set of one or more values of the corresponding user attributes for the cluster of at least the threshold cluster size.

5. The one or more non-transitory computer-readable media of claim 1, the operations further comprising:

training a machine learning model to generate the recommended list of actions for the cluster of users based on historical user actions, the training comprising:

obtaining historical data comprising historical actions associated with at least one cluster of users, the at least one cluster identified using one or more attributes;

generating a training set comprising the one or more attributes corresponding to the at least one cluster of users and a set of historical actions associated with the at least one cluster of users;

training the machine learning model to associate the set of historical actions with the one or more attributes corresponding to the at least one cluster;

wherein generating, by the system, the recommended list of actions for the cluster of users comprises generating, based on the trained machine learning model, the recommended list of actions for the cluster of users;

receiving user input defining one or more requirements for the recommended list of actions;

modifying the recommended list of actions, generated by the trained machine learning model, based on the received requirements; and displaying the modified list of actions.

6. The one or more non-transitory computer-readable media of claim 5, wherein:

the recommended list of actions comprises an ordered list of at least a first action and a second action to be performed after the first action; and the user input defining one or more requirements for the recommended list of actions comprises requiring the second action to be performed before the first action.

7. The one or more non-transitory computer-readable media of claim 5, wherein:

the recommended list of actions comprises an ordered list of at least a first action and a second action to be performed after the first action; and the user input defining one or more requirements for the recommended list of actions comprises removing at least one of the first action and the second action from the list.

8. The one or more non-transitory computer-readable media of claim 5, wherein:

the recommended list of actions comprises an ordered list of at least a first action and a second action to be performed after the first action; and the user input defining one or more requirements for the recommended list of actions comprises assigning a priority to one or more both of the first action or the second action that maintains a location in a subsequently generated ordered list of actions.

9. The one or more non-transitory computer-readable media of claim 5, wherein the actions in the list of actions comprise a list of navigation links that, when engaged, render corresponding resources used for executing the actions in the list.

10. A method comprising:

identifying a first data attribute, of a plurality of data attributes, for use in clustering a set of data items;

wherein the set of data items comprises a set of user profiles;

wherein the plurality of data attributes comprises user attributes associated with the set of user profiles;

determining, by a system, a first set of one or more values for the first data attribute that result in one or more data item clusters of at least a threshold cluster size;

wherein the threshold cluster size is a minimum number of users, associated with a cluster generated based on a particular value of the first data attribute, for the system to recommend the particular value for the first data attribute;

presenting, by the system, a first graphical user interface (GUI) comprising a value selection element associated with the first data attribute, at least by:

populating, by the system, the value selection element with the first set of one or more values for the first data attribute that results in one or more data item clusters of at least the threshold cluster size; and refraining, by the system, from populating the value selection element with a second set of one or more values for the first data attribute that do not result in data item clusters of at least the threshold cluster size;

receiving, by the system via the first GUI, first user input selecting a first system-recommended value, of the first set of one or more values, for the first data attribute;

responsive to receiving the first user input selecting the first system-recommended value for the first data attribute:

identifying, by the system, a particular cluster of data items, of at least the threshold cluster size, comprising data items associated with the first system-recommended value for the first data attribute, wherein the particular cluster of data items corresponds to a cluster of users;

generating, by the system, a recommended list of actions for the cluster of users based on historical user actions; and dynamically presenting, by the system concurrently with presenting the value selection element in the first GUI, a second GUI comprising the recommended list of actions for the cluster of users.

11. The method of claim 10, further comprising:

clustering the set of user profiles into clusters based on a similarity score above a similarity threshold, wherein the similarity score is generated by comparing actions associated with user profiles associated with a particular cluster and corresponding prior actions of users associated with the particular cluster.

12. The method of claim 10, further comprising displaying a histogram of a set of frequent actions associated with user profiles of a cluster.

13. The method of claim 10, further comprising:

training a machine learning model to generate the recommended list of actions for the cluster of users based on historical user actions, the training comprising:

obtaining historical data comprising historical actions associated with at least one cluster of users, the at least one cluster identified using one or more attributes;

generating a training set comprising the one or more attributes corresponding to the at least one cluster of users and a set of historical actions associated with the at least one cluster of users;

training the machine learning model to associate the set of historical actions with the one or more attributes corresponding to the at least one cluster;

wherein generating, by the system, the recommended list of actions for the cluster of users comprises generating, based on the trained machine learning model, the recommended list of actions for the cluster of users;

receiving user input defining one or more requirements for the recommended list of actions;

modifying the recommended list of actions, generated by the trained machine learning model, based on the received requirements; and displaying the modified list of actions.

14. The method of claim 13, wherein:

the recommended list of actions comprises an ordered list of at least a first action and a second action to be performed after the first action; and the user input defining one or more requirements for the recommended list of actions comprises requiring the second action to be performed before the first action.

15. The method of claim 13, wherein:

the recommended list of actions comprises an ordered list of at least a first action and a second action to be performed after the first action; and the user input defining one or more requirements for the recommended list of actions comprises removing at least one of the first action and the second action from the list.

16. The method of claim 13, wherein:

the recommended list of actions comprises an ordered list of at least a first action and a second action to be performed after the first action; and the user input defining one or more requirements for the recommended list of actions comprises assigning a priority to one or more both of the first action or the second action that maintains a location in a subsequently generated ordered list of actions.

* * * * *